US012438301B2

(12) United States Patent
Stolze

(10) Patent No.: US 12,438,301 B2
(45) Date of Patent: Oct. 7, 2025

(54) CONDUCTOR CONNECTION TERMINAL, USE THEREOF, AND METHOD FOR MOUNTING A CONDUCTOR CONNECTION TERMINAL

(71) Applicant: WAGO Verwaltungsgesellschaft mbH, Minden (DE)

(72) Inventor: Henry Stolze, Bad Frankenhausen (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 364 days.

(21) Appl. No.: 18/102,533

(22) Filed: Jan. 27, 2023

(65) Prior Publication Data

US 2023/0178905 A1 Jun. 8, 2023

Related U.S. Application Data

(63) Continuation of application No. PCT/EP2021/070864, filed on Jul. 26, 2021.

(30) Foreign Application Priority Data

Jul. 30, 2020 (DE) ..................... 10 2020 120 150.8

(51) Int. Cl.
*H01R 13/502* (2006.01)
*H01R 4/48* (2006.01)

(52) U.S. Cl.
CPC ........... *H01R 13/502* (2013.01); *H01R 4/484* (2023.08); *H01R 4/4821* (2023.08); *H01R 4/485* (2023.08)

(58) Field of Classification Search
CPC .... H01R 13/502; H01R 4/484; H01R 4/4821; H01R 4/485
See application file for complete search history.

(56) References Cited

U.S. PATENT DOCUMENTS 10,468,787 B2 11/2019 Lybrand
11,024,988 B2 6/2021 Koellmann
(Continued)

FOREIGN PATENT DOCUMENTS

DE 102008032267 A1 1/2009
DE 102013101830 A1 7/2014
(Continued)

OTHER PUBLICATIONS

International Search Report dated Nov. 5, 2021 in corresponding application PCT/EP2021/070864.
(Continued)

*Primary Examiner* — Abdullah A Riyami
*Assistant Examiner* — Nader J Alhawamdeh
(74) *Attorney, Agent, or Firm* — Muncy, Geissler, Olds & Lowe, P.C.

(57) ABSTRACT

A conductor connection terminal with a contact insert that has a bus bar and a clamping spring, and with a housing that has a first housing part and a second housing part and that at least partially encloses the contact insert, wherein the first housing part has a first housing wall with a receiving structure for receiving the contact insert, and the second housing part has multiple additional housing walls for covering the contact insert received by the first housing part. A conductor connection terminal is also provided with a contact insert that has a bus bar and a clamping spring, and with a housing that has a first housing part and a second housing part and that at least partially encloses the contact insert. The first housing part has a first conductor insertion channel section and the second housing part has a second conductor insertion channel section.

21 Claims, 7 Drawing Sheets

(56) References Cited

U.S. PATENT DOCUMENTS

| | | | | |
|---|---|---|---|---|
| 11,764,494 | B2 * | 9/2023 | Stolze | H01R 4/4821<br>439/441 |
| 2009/0017691 | A1 * | 1/2009 | Breen, IV | H01R 13/20<br>439/658 |
| 2017/0331200 | A1 * | 11/2017 | Koellmann | H01R 13/506 |
| 2018/0254568 | A1 * | 9/2018 | Koellmann | H01R 9/2675 |
| 2023/0178905 | A1 * | 6/2023 | Stolze | H01R 13/502<br>439/723 |

FOREIGN PATENT DOCUMENTS

| | | | | |
|---|---|---|---|---|
| DE | 102013101830 | B4 | 12/2017 | |
| DE | 102016116510 | A1 | 3/2018 | |
| DE | 102018202542 | A1 * | 8/2018 | H01R 4/4836 |
| DE | 112018002350 | T5 | 1/2020 | |
| DE | 202018004944 | U1 | 1/2020 | |

OTHER PUBLICATIONS

International Preliminary Report on Patentability dated Feb. 9, 2023 in corresponding application PCT/EP2021/070864.

* cited by examiner

CONDUCTOR CONNECTION TERMINAL, USE THEREOF, AND METHOD FOR MOUNTING A CONDUCTOR CONNECTION TERMINAL

This nonprovisional application is a continuation of International Application No. PCT/EP2021/070864, which was filed on Jul. 26, 2021, and which claims priority to German Patent Application No. 10 2020 120 150.8, which was filed in Germany on Jul. 30, 2020, and which are both herein incorporated by reference.

BACKGROUND OF THE INVENTION

Field of the Invention

The present invention relates to a conductor connection terminal, the use of a conductor connection terminal, and a method for assembling a conductor connection terminal.

Description of the Background Art

Conductor connection terminals can be, in particular, terminals used for removable coupling or connection of electrical conductors and can ensure an electrical contact of the conductor by means of a mechanical securing of the connected conductor in the connected state. The conductor connection terminals can be spring-loaded terminals, which are also called plug-in terminals, spring terminals, cage clamp terminals, cage terminals, or spring-type terminals, for example.

Conductor connection terminals are known in which a contact insert can be placed in a laterally open recess of a housing and this recess can be closed with a cover.

SUMMARY OF THE INVENTION

It is therefore an object of the present invention to provide an improved conductor connection terminal with simplified construction, easier assembly, and greater operational safety.

The conductor connection terminal can have a contact insert that has a bus bar and a clamping spring, and a housing that has a first housing part and a second housing part and that at least partially encloses the contact insert, wherein the first housing part has a first housing wall with a receiving structure for receiving the contact insert, and the second housing part has multiple additional housing walls for covering the contact insert received by the first housing part.

The housing can enclose the contact insert at least partially. The housing can completely enclose or surround the contact insert. The housing protects the contact insert, for example from environmental conditions and from inadvertent or unauthorized access to the contact insert by a person. The housing permits an electrical insulation of the contact insert from the environment and can therefore be made of an insulating material such as a plastic. The housing is constructed in at least two parts with a first and a second housing part and can be capable of being fitted together into a complete housing with the first, the second, and any additional housing parts. The first and the second housing part can be fitted together along a connection line, for example. Housing walls can have a flush transition to one another at the connection line.

The first housing part can have a receiving structure for receiving the contact insert. The receiving structure can, for example, be a receiving shape designed as a single piece with the first housing part, and can be designed as, e.g., an attachment structure or insert structure. The receiving structure can have, for example, material projections, supporting elements, negative contours of the contact insert, fastening structures such as clip receptacles, or other means for interlocking and/or frictional connection, in particular removable connection, of the first housing part to the contact insert. The receiving structure can have a spring support, for example. The receiving structure can allow a securing of the received contact insert by reducing selected degrees of freedom of motion. The receiving structure can simplify the positioning and assembly of the contact insert on the first housing part by means of a predefined attachment structure or insert structure. The first housing part can also be called base housing or basic housing.

The second housing part can have multiple housing walls. The main extents of the housing walls can run in different planes. For example, adjacent housing walls can be essentially perpendicular to one another. Housing walls of the second housing part can be opposite one another and can run essentially parallel to one another, for example. Some or all housing walls can be designed with their full area uninterrupted. Some or all housing walls can have apertures. The second housing part can also be called cover housing. Usually, in a typical sequence of assembling a housing with a basic housing and a cover housing, the cover housing is attached to the basic housing as the final step, for which reason the second housing part can be described in the present case as cover housing. At the same time, its feature of multiple housing walls distinguishes the second housing part from a simple housing cover that usually has only one housing wall, such as is known from the prior art.

The conductor connection terminal can have a simplified construction and allows easier assembly of the conductor connection terminal. The receiving structure of the first housing wall of the first housing part is easily accessible and allows fast and reliable assembly of the contact insert on the first housing part. The second housing part can be arranged on the first housing part and connected thereto reliably and quickly. Adherence to required clearances and creepage distances for the operational safety of the conductor connection terminal is ensured by the covering of the contact insert by means of multiple housing walls of the second housing part.

The receiving structure can have at least one frame wall that projects essentially at right angles from the first housing wall and that, together with the first housing wall, delimits a receiving space for the contact insert. In this way, a housing wall with a receiving structure is provided that allows a defined insertion of the contact insert. The receiving space delimits and visually indicates the intended place of installation of the contact insert. The frame wall can reduce the degrees of freedom of motion of the contact insert. Owing to the delimited receiving space, the assembly of the conductor connection terminal is more reliable and easier. Furthermore, the frame wall can provide improved mechanical protection and support the electrical insulation of the contact insert. The frame wall can be offset below the boundary or a terminating edge of the first housing wall, forming a step, in order to form a receiving area for a housing wall of the second housing part.

The frame wall can extend along a longitudinal side of the contact insert. A longitudinal side of the contact insert can be essentially parallel to a direction of insertion of an electrical conductor into the conductor connection terminal. An end face of the contact insert can run essentially at right angles to a direction of insertion of an electrical conductor into the conductor connection terminal. The contact insert can have four longitudinal sides and two end faces, for example. The assembled housing can also have four longitudinal sides and two end faces, for example. Intuitive assembly of the contact insert is supported, and mechanical protection as well as insulation is improved over the length of the contact insert, by routing the frame wall along a longitudinal side of the contact insert.

A frame wall can extend in each case along a bottom of the contact insert facing the bus bar of the contact insert and/or along a top of the contact insert facing away from the bus bar of the contact insert. A bottom and a top of the contact insert can each correspond to a longitudinal side of the contact insert. A bus bar of the contact insert can be arranged on a bottom, for example. A top can be a side or longitudinal side of the contact insert opposite the bottom or extending essentially parallel to the bottom. In one embodiment, the first housing wall can have two frame walls. The frame walls can delimit a receiving space for the contact insert. The receiving space can be delimited on three sides of the receiving space extending parallel to a direction of insertion of an electrical conductor by walls, namely by the first housing wall and two frame walls. Intuitive assembly of the contact insert is supported by routing a frame wall along a top or bottom of the contact insert. Mechanical protection as well as insulation is improved over the length of the contact insert by routing one frame wall each on a top and a bottom of the contact insert. Moreover, a receiving space for the contact insert is delimited and defined more precisely.

The second housing part can have at least three housing walls for covering the contact insert and/or the first housing part. A covering function of the second housing part is improved by this means. At least one of the at least three housing walls can run essentially parallel to a longitudinal side and/or essentially parallel to an end face of the contact insert. Two of the at least three housing walls can be arranged essentially perpendicular to one another in each case. The second housing part can also have, in particular, at least four or at least five housing walls for covering the contact insert and/or the first housing part. The second housing part can have, for example, three housing walls that each run essentially parallel to a longitudinal side of the contact insert and two housing walls that each run essentially parallel to an end face of the contact insert.

At least one housing wall of the second housing part can partially or completely overlaps a frame wall of the first housing part in the assembled state of the housing. For example, in the assembled state of the housing, at least one housing wall of the second housing part can overlap a frame wall of the first housing part with a degree of overlap of more than 50%, particularly more than 70%, further particularly more than 80%, wherein the degree of overlap can be the sum of the areas of the housing wall and frame wall that face one another and overlap one another expressed as a percentage of the sum of the total areas of the housing wall and frame wall that face one another. A housing wall of the second housing part and a frame wall of the first housing part can therefore overlap at least partially. With the overlap, a mechanical contact can be present between a housing wall and a frame wall, which is to say their surfaces facing one another can touch. The overlapping frame and housing walls can extend essentially parallel to one another, for example. When there is overlap, the housing wall of the second housing part can form the outer wall facing the environment and the frame wall of the first housing part can form the inner wall facing the contact insert. As a result, the cover housing can easily be attached to or pushed onto the basic housing. Depending on requirements, the overlap can also be present as a clearance fit, transition fit, or interference fit of a housing wall with a frame wall. As a result of the overlap, a double wall is formed locally by the first and second housing parts, thus improving the mechanical protection and the electrical insulation of the conductor connection terminal. Moreover, a predetermined assembly arrangement and orientation of the first and second housing parts relative to one another is provided as a result of the planned overlap, and assembly is simplified as a result.

The first housing part and the second housing part can each have a U-shaped cross section, wherein, in the assembled state of the housing, the arms of the U of the second housing part receive the arms of the U of the first housing part between them, and the arms of the U of the first housing part receive the contact insert between them. The second housing part, as cover housing, can have a larger U-shaped cross section than the first housing part, as basic housing, so that the cover housing can be attached to or pushed onto the basic housing, and the cover housing laps over the basic housing on multiple sides in the assembled state of the housing. A simple construction of the conductor connection terminal with intuitive and easier assembly is made possible by this means. A positive engagement that permits a secure mechanical connection of the housing parts is realized by the interleaved U arms of the first and second housing parts. Moreover, the contact insert is securely enclosed in the cross section of the two housing parts. As a result of the receiving of the arms of the U of the first housing part between the arms of the U of the second housing part, double walls are locally formed in the area of the mutual overlap of the U arms, thus improving the mechanical protection and the electrical insulation of the conductor connection terminal.

The second housing part can have a housing end wall for covering the housing on the end face. In particular, the second housing part can have two housing end walls for covering the housing on the end face at two opposite end faces of the housing. A housing end wall can extend essentially at right angles to a direction of insertion of an electrical conductor into the conductor connection terminal. A housing end wall can extend essentially at right angles to a longitudinal side of the housing. An end face of the housing can extend essentially parallel to an end face of the contact insert placed in the housing. An end face of the housing can be a housing side through which a conductor inserted into the conductor connection terminal enters the housing. An end face of the housing can have a smaller housing surface area than a longitudinal side of the housing. A housing end wall can be a housing wall of the housing or housing part. A covering function of the second housing part in the area on the end face of the placed contact insert is improved by a housing end wall. Alternatively, or in addition, the first housing part or basic housing can also have one or more housing end walls. A housing end wall of the first housing part can at least partially overlap or overlie a housing end wall of the second housing part. One or more housing end walls can have an aperture, for example a conductor insertion opening.

The conductor connection terminal can be a double terminal for two electrical conductors that can each be inserted into the conductor connection terminal in a respective insertion direction. The respective insertion directions can be opposite one another, for example. In this way, two conductors can be connected using the conductor connection terminal without significant additional installation space or structural complexity. For this purpose, the contact insert can have two clamping springs arranged opposite one another and a common bus bar for both spring-loaded terminal connections, for example. The housing of the conductor connection terminal can have, for example, two opposite housing walls that are arranged on the end faces and that have conductor insertion openings. In other embodiments, it is also possible to connect more than two electrical conductors using the conductor connection terminal.

A partition can project at right angles from the frame wall and/or from the first housing wall. A spatial separation of two or more conductor connection spaces for spring-loaded terminal connections can be made possible or improved in this way. The second housing part can have a partition receptacle, which is designed, for example, as two likewise wall-like material projections spaced apart from one another, between which the partition can slip. In this way, the stability of the conductor connection terminal is increased, and assembly is simplified, since the partition receptacle can serve as a guide and orientation for positioning of the first and second housing parts relative to one another. The partition and the partition receptacle can also be removably connectable to one another by means of a snap-in connection in order to improve the connection of the first and the second housing parts to one another. The insulation of the conductor connection spaces from one another is further improved by a wall-like partition receptacle.

One or more frame walls can have a frame recess, which can run parallel to a housing wall recess of the second housing part, for example, and forms a grip recess together therewith. The grip recess can facilitate gripping of the conductor connection terminal or also, for example, visually indicate a top or bottom of the conductor connection terminal.

The frame wall can have a support block projecting at right angles from the frame wall. By this means, a contact insert can, for example, be supported at its end face or its axial movability can be delimited. The support block can define the receiving space for the contact insert more precisely. The stability of the first housing part can be increased by the support block. The frame wall can also have two or more support blocks projecting at right angles from the frame wall. The support block or blocks, together with one or more frame walls and the first housing wall of the first housing part, can form a receiving structure or an inner housing for defined receiving of the contact insert.

The support block can have a conductor insertion channel area. As a result, the guidance of an inserted electrical conductor is improved and operation of the conductor connection terminal is simplified.

The contact insert and/or the housing can have a symmetrical construction. The construction of the conductor connection terminal is further simplified by this means. Furthermore, assembly is made easier because, for example, the contact insert can be placed in the first housing part in more than just one orientation. The axis of symmetry can coincide with, for example, a central axis of the contact insert or of the housing that runs through the spatial center point of the body of the contact insert or of the housing.

The first housing part and the second housing part can be snapped, staked, and/or welded together in the assembled state of the housing. A reliable connection between the first and second housing parts is guaranteed and the stability of the conductor connection terminal is increased by this means.

The first housing part can have a first conductor insertion channel section and the second housing part has a second conductor insertion channel section, wherein, in the assembled state of the housing, the first conductor insertion channel section and the second conductor insertion channel section together form a conductor insertion channel for insertion of an electrical conductor. The combined formation of the conductor insertion channel increases its stability and extension. In addition, the assembly of the conductor connection terminal is simplified and intuitive, since the conductor insertion channel sections are to be arranged adjacent to each other when the first and second housing parts are being connected to one another. In addition, production of the first and second housing parts is simplified when only one conductor insertion channel section is provided on each of them, and fewer undercuts, for example, must be taken into account as a result. The first conductor insertion channel section can be associated with the basic housing of the conductor connection terminal, and the second conductor insertion channel section can be associated with the cover housing of the conductor connection terminal. The first conductor insertion channel section can form an inner section of the conductor insertion channel facing the receiving space or contact insert, and the second conductor insertion channel section can form an outer section of the conductor insertion channel facing the environment. The second conductor insertion channel section can have a conductor insertion opening accessible from outside the conductor connection terminal.

The first conductor insertion channel section and/or the second conductor insertion channel section can be designed to be essentially or predominantly closed on the perimeter. In particular, the first conductor insertion channel section and/or the second conductor insertion channel section can be designed to be closed more than 180°, in particular more than 270°, on the perimeter. The first conductor insertion channel section and/or the second conductor insertion channel section can thus have an essentially closed cross section. In this way, the conductor insertion channel is more precisely delimited and the stability of the conductor connection terminal in the conductor insertion area is increased. Reliable and intuitive insertion of an electrical conductor into the conductor insertion channel is possible. When the first conductor insertion channel section and the second conductor insertion channel section are designed to be essentially closed on the perimeter, an at least partial overlap of the area of the first housing part and of the second housing part adjacent to the conductor insertion channel can occur, so that increased stability and better insulation of the contact insert by the housing exist due to the at least partial overlap.

The first conductor insertion channel section can be arranged after the second conductor insertion channel section in the direction of conductor insertion. Consequently, when the electrical conductor is inserted, it initially passes through the second conductor insertion channel section and then through the first conductor insertion channel section.

It is advantageous when the housing can have a conductor insertion opening for insertion of an electrical conductor, which opening is formed in the second conductor channel section. The conductor insertion opening can define the insertion area of the electrical conductor in the housing and is therefore visible from outside. For example, in the case of a conductor insertion channel that tapers in the conductor insertion direction, the conductor insertion opening can constitute a region of the largest cross section of the conductor insertion channel. A housing wall, in particular a housing end wall of the second housing part or cover housing, can enclose or frame the conductor insertion opening. The conductor insertion opening can be implemented as an aperture in a housing wall or housing end wall of the second housing part or cover housing.

The object is also attained by a use of a conductor connection terminal having one of the above-described features as a repair terminal for connecting line sections of a severed electrical conductor or two free conductor ends. On account of the simple construction, the easier assembly, and the high insulating capacity of the conductor connection terminal, it is especially beneficial for a use in the repair field.

The object is also attained by a method for assembling a conductor connection terminal with a contact insert that has a bus bar and a clamping spring, and with a housing that has a first housing part and a second housing part and that at least partially encloses the contact insert, in which the contact insert is placed in the first housing part and subsequently the second housing part having multiple housing walls is arranged on the first housing part and connected thereto. In this way, a method is provided with which an especially simple, fast, and intuitive assembly of a conductor connection terminal is made possible. Adherence to required clearances and creepage distances for the operational safety of the conductor connection terminal is ensured by the covering of the contact insert by means of multiple housing walls of the second housing part. The first housing part can constitute a basic housing and the second housing part can constitute a cover housing. The contact insert can, in particular, be placed in a receiving space of the first housing part formed by a first housing wall and a frame wall projecting at right angles from the first housing wall. As a result of the arrangement of the second housing part on the first housing part, a common conductor insertion channel can, in particular, be created from a first conductor insertion channel section of the first housing part and a second conductor insertion channel section of the second housing part. The contact insert can be created in an upstream process step by fitting together at least one bus bar and at least one clamping spring. The contact insert can be preassembled, in particular.

The placement direction of the contact insert in the first housing part can be at right angles to the direction of longitudinal extent of the contact insert. The direction of longitudinal extent of the contact insert can run essentially parallel to a direction of conductor insertion. During assembly, the contact insert is not inserted or pushed into a housing with an end face forward in a direction of conductor insertion or opposite thereto, but instead is moved toward the first housing part at right angles to this direction and, for example, is put on a receiving structure and/or in a receiving space of the first housing part. Simple and fast assembly of the conductor connection terminal is made possible by this means. It is also beneficial when the arrangement of the second housing part on the first housing part is accomplished in an attachment direction that, in particular, corresponds to the placement direction of the contact insert in the first housing part or runs parallel thereto.

It is advantageous when a conductor connection terminal according to one of the above-described features is assembled using the method.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
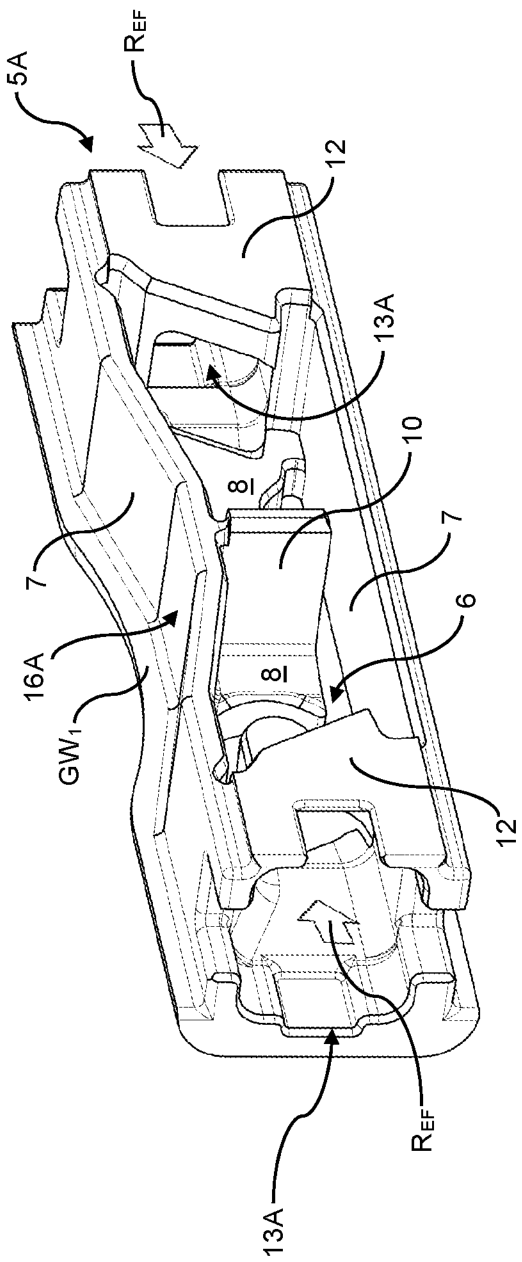
FIG. 1 is a perspective front view of a first housing part.

FIG. 1 shows a front view of a first housing part 5A for a conductor connection terminal 1 designed as a double terminal and shown in FIGS. 6 to 10 by way of example. The first housing part 5A can be fitted together with a second housing part 5B shown by way of example in FIGS. 3 to 5 to form a housing 5 of the conductor connection terminal 1. The housing 5 of the conductor connection terminal 1 is constructed in two parts from the first housing part 5A and the second housing part 5B in the exemplary embodiments shown. It is fundamentally also possible to fit together the housing 5 of the conductor connection terminal 1 from more than two housing parts. The housing 5 of the conductor connection terminal 1 is equipped to at least partially enclose a contact insert 2, shown by way of example in FIGS. 6, 7, and 11, having a bus bar 3 and one or more clamping springs 4, in order to protect the contact insert 2 from environmental conditions and to achieve an electrical insulation of the contact insert 2 from the environment.

The first housing part 5A has a first housing wall $GW_1$ with a receiving structure 6 for receiving the contact insert 2. In the exemplary embodiments shown, the receiving structure 6 is formed by multiple structural elements such as frame walls 7 (explained further below), a partition 10, spring supports, and support blocks 12. It is also possible, however, to provide more or fewer structural elements to form the receiving structure 6.

Two frame walls 7 project essentially perpendicularly from the first housing wall $GW_1$ and, with the first housing wall $GW_1$, delimit a receiving space 8 for the contact insert 2. The frame walls 7 extend along longitudinal sides of the contact insert 2 to be placed. In the exemplary embodiment shown, a frame wall 7 extends in each case along a bottom $K_U$ (shown in FIG. 11) of the contact insert 2 facing the bus bar 3 of the contact insert 2, and along a top $K_O$ (shown in FIG. 11) of the contact insert 2 facing away from the bus bar of the contact insert 2. One of the two frame walls 7 shown has a frame recess 16A, which can, for example, run parallel to a housing wall recess 16B (FIG. 3) of the second housing part 5B and forms a grip recess together therewith. The grip recess can facilitate gripping of the conductor connection terminal 1 and, in the exemplary embodiments shown, visually indicate a top of the conductor connection terminal 1 facing away from the bus bar 3 of the contact insert 2.

A partition 10, which among other things provides for spatial separation and electrical insulation of two adjacent connection spaces for electrical conductors, projects essentially perpendicularly from the first housing wall $GW_1$ and from one of the frame walls 7. In the exemplary embodiment, the partition 10 defines a central area of the first housing part; starting from this area, a spring-loaded terminal connection for an electrical conductor can be provided on each of the left and right sides. For this purpose, an electrical conductor can be inserted into the conductor connection terminal 1 in each direction of insertion $R_{EF}$.

Support blocks 12, which further delimit the receiving space 8 for the contact insert 2 and reduce or prevent a translational movability of the contact insert 2 in the same or opposite direction to the insertion direction $R_{EF}$, project from the frame walls 7.

Moreover, a first conductor insertion channel section 13A is formed on the first housing part 5A for each side of the double terminal, and said first conductor insertion channel section, together with a second conductor insertion channel section 13B (shown by way of example in FIG. 3) of the second housing part 5B, forms a conductor insertion channel 13 in the assembled state of the housing 5.

Figure 2:
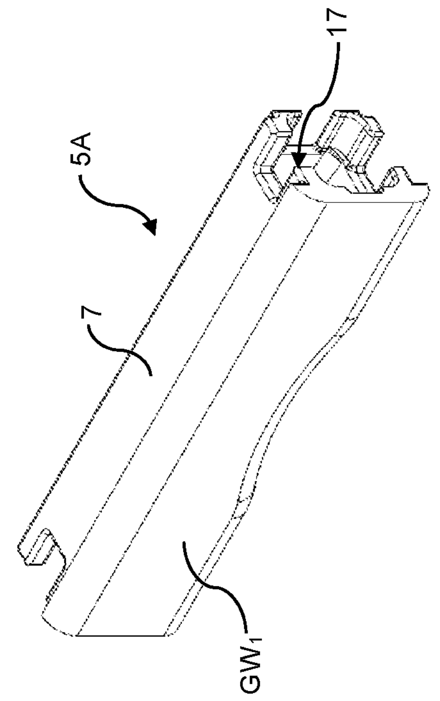
FIG. 2 is a perspective rear view of the first housing part.

In FIG. 2, the first housing part 5A is shown in a rear view. It can be seen, for example, how one of the frame walls 7 projects essentially perpendicularly from the first housing wall $GW_1$. In this case, the frame wall 7 is offset slightly inward, which is to say it has no surface running flush with a terminating edge of the first housing wall GM. The offset 17 formed between the frame wall 7 and the terminating edge of the first housing wall $GW_1$ forms a receiving area for a housing wall of the second housing part 5B, for example the fourth housing wall $GW_4$.

Figure 3:
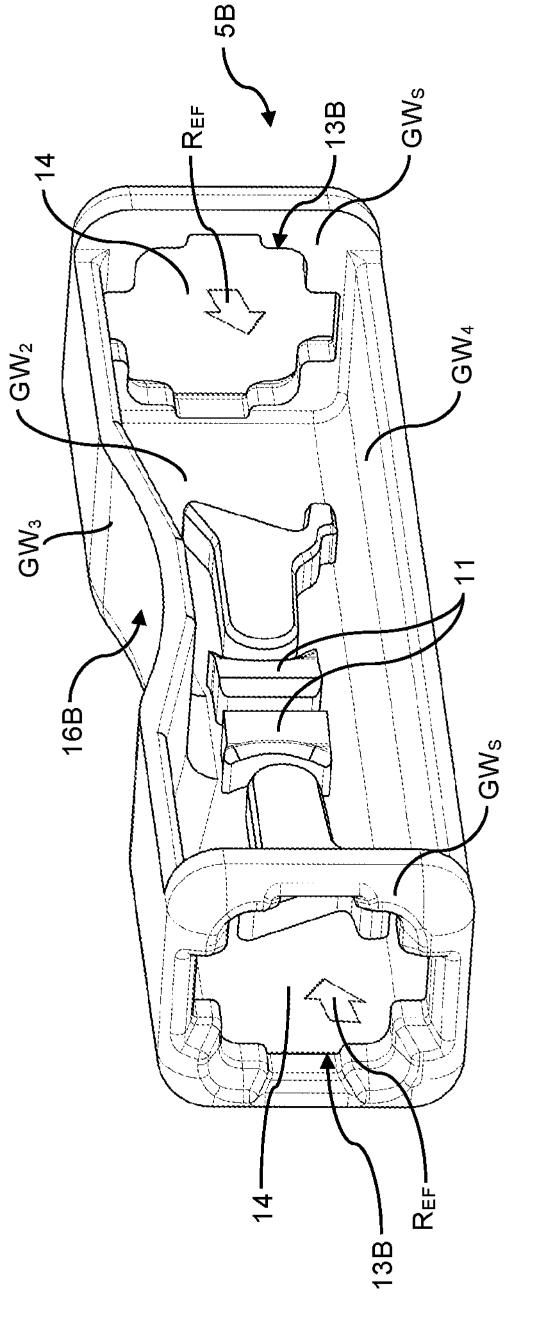
FIG. 3 is a perspective front view of a second housing part.

FIG. 3 shows a front view of a second housing part 5B for the conductor connection terminal 1. The second housing part 5B has multiple housing walls; to be precise, in the exemplary embodiment shown it has a second housing wall $GW_2$, a third housing wall $GW_3$, a fourth housing wall $GW_4$, as well as two housing end walls GWs. The housing walls $GW_2$, $GW_3$, $GW_4$, and GWs serve to at least partially cover the contact insert 2 of the conductor connection terminal 1 and, when completed by the first housing wall $GW_1$ of the first housing part 5A, form the housing 5 of the conductor connection terminal 1 in the assembled state of the first and second housing parts 5A and 5B. The second housing part 5B acts here as a cover housing and is equipped to be attached to the first housing part 5A after an assembly of a contact insert 2 in the first housing part 5A. The housing walls GM, $GW_2$, $GW_3$, $GW_4$ can be associated with the longitudinal sides of the conductor connection terminal 1 or of the housing 5 or of the contact insert 2, while the housing end walls GWs can be associated with the end faces of the conductor connection terminal 1 or of the housing 5 or of the contact insert 2. The housing end walls GWs of the second housing part 5B each have an aperture that forms both a conductor insertion opening 14 and a second conductor insertion channel section 13B. An electrical conductor—in the exemplary embodiment shown, an electrical conductor from each of the opposite end faces of the second housing part 5B—can be inserted into the conductor insertion opening 14 and the adjoining second conductor insertion channel section 13B in the housing 5 in a conductor insertion direction $R_{EF}$.

The second housing part 5B has a partition receptacle 11 in the form of two wall-like material projections spaced apart from one another, between which the partition 10 of the first housing part 5A can slip. The second housing part 5B has a housing wall recess 16B that, in the assembled state of the housing 5, overlaps a frame recess 16A of the first housing part 5A and forms a grip recess together therewith.

Figure 4:
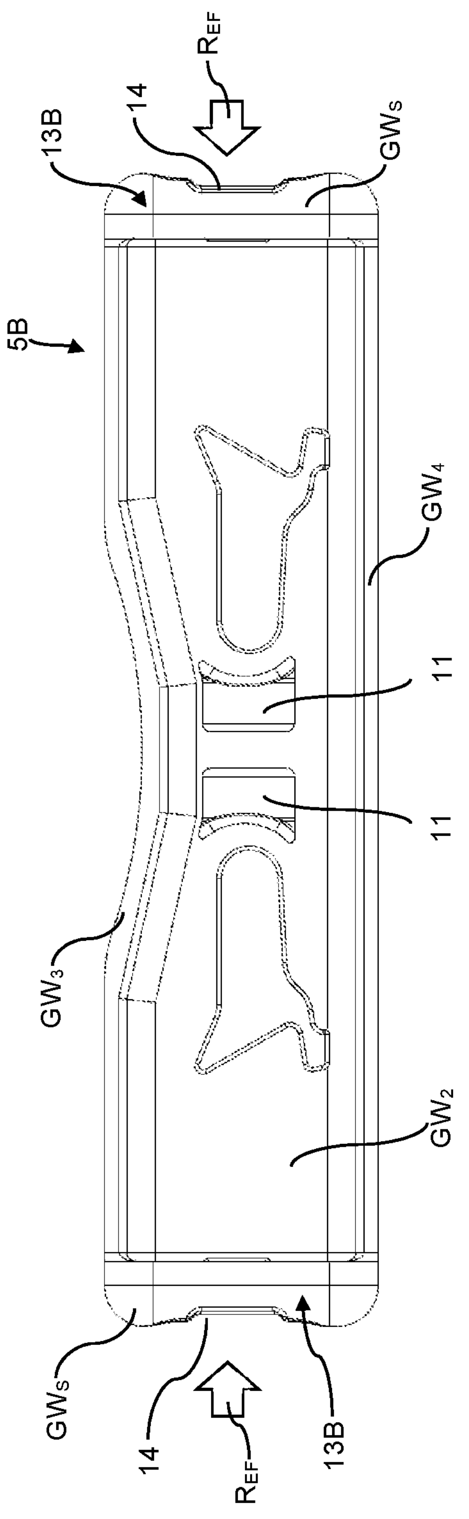
FIG. 4 is another front view of the second housing part.
Figure 5:
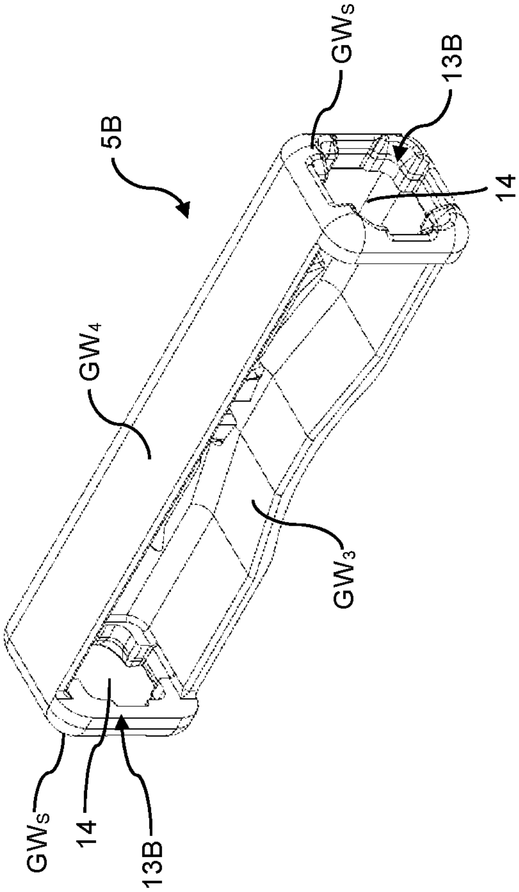
FIG. 5 is a perspective bottom view of the second housing part.

FIGS. 4 and 5 show the second housing part 5B in another front view and in a bottom view for more detailed illustration.

Figure 6:
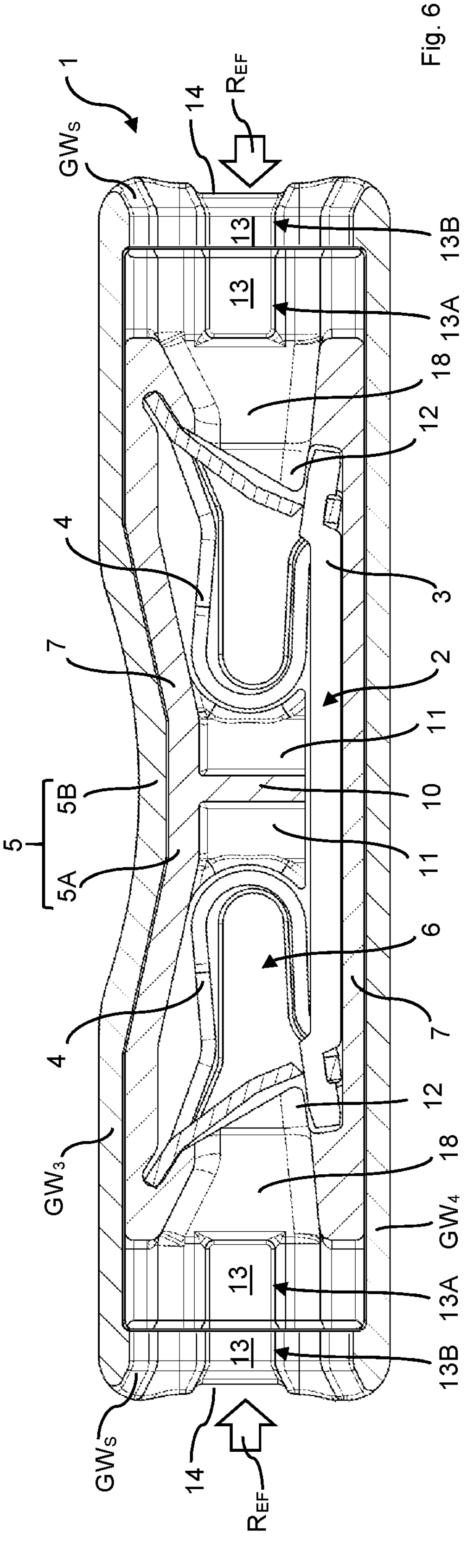
FIG. 6 is a sectional view of a conductor connection terminal with placed contact insert and assembled housing.

FIG. 6 shows the conductor connection terminal 1 in an assembled state, which is to say with a placed contact insert 2 and with housing 5, composed of the first housing part 5A and the second housing part 5B, enclosing the contact insert 2. Visible are the contact insert 2 with a bus bar 3 and two clamping springs 4 for two spring-loaded terminal connections of two electrical conductors that are not shown and that can be inserted into the conductor connection terminal 1 in insertion direction $R_{EF}$. It can be seen that the third housing wall $GW_3$ and the fourth housing wall $GW_4$ of the second housing part 5B overlap the frame walls 7 of the first housing part 5A so that double walls are present in each case that increase the insulation and the stability of the conductor connection terminal 1. It can likewise be seen that the first conductor insertion channel section 13A of the first housing part 5A and the second conductor insertion channel section 13B of the second housing part 5B together form a conductor insertion channel 13 for insertion of an electrical conductor starting at the conductor insertion opening 14 of the second housing part 5B. In this case, the support blocks 12 additionally have a conductor insertion channel area 18 for continuing the conductor insertion channel 13. It furthermore becomes clear how the receiving structure 6 of the conductor connection terminal 1 with multiple structural elements such as spring supports, the partition receptacle 11, the frame walls 7, and the support blocks 12 define a delimited receiving space for the contact insert 2 so that the latter is held securely in the housing 5 and assembly is made easier. In addition, it can be seen that the partition 10 slips between the material projections of the partition receptacle 11, thus also promoting a positioning and securing of the first housing part 5A and of the second housing part 5B to one another. A symmetrical construction of the conductor connection terminal 1 with an axis of symmetry (not shown) that runs through the partition 10 and is perpendicular to the insertion direction $R_{EF}$ also becomes clear.

The conductor connection terminal 1 has a simplified construction and allows easier assembly of the conductor connection terminal 1. The receiving structure 6 of the first housing wall $GW_1$ of the first housing part 5A is easily accessible and allows fast and reliable assembly of the contact insert 2 on the first housing part 5A. The second housing part 5B can be arranged on the first housing part 5A and connected thereto reliably and quickly. Adherence to required clearances and creepage distances for the operational safety of the conductor connection terminal 1 is ensured by the covering of the contact insert 2 by means of multiple housing walls $GW_2$, $GW_3$, $GW_4$, GWs of the second housing part 5B.

Figure 7:
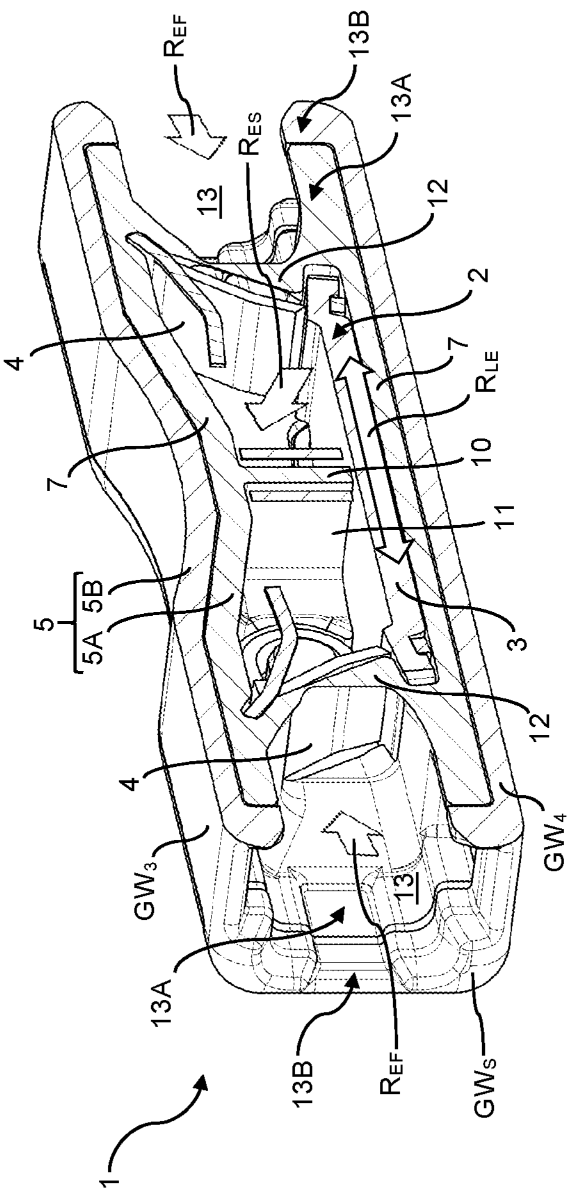
FIG. 7 is a perspective sectional view of the conductor connection terminal with placed contact insert and assembled housing.

FIG. 7 shows the representation of the conductor connection terminal 1 from FIG. 6 in a perspective view for further illustration. In addition, the direction of longitudinal extent $R_{LE}$ of the contact insert 2 is indicated by a double-headed arrow. During an assembly of the conductor connection terminal 1, the contact insert 2 is placed in the first housing part 5A in a placement direction RES at right angles to this direction of longitudinal extent $R_{LE}$.

Figure 8:
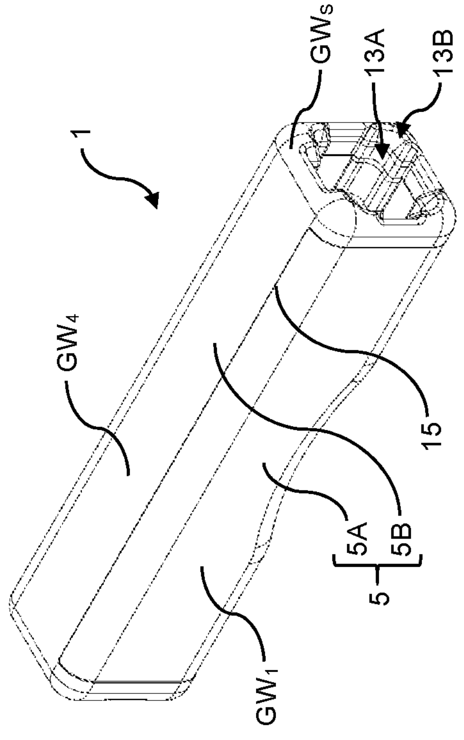
FIG. 8 is a perspective rear view of the conductor connection terminal with assembled housing.

FIG. 8 shows a perspective rear view of the conductor connection terminal 1 with assembled housing 5. It can be seen that the housing parts 5A, 5B are fitted together along a connection line 15. The first housing wall $GW_1$ of the first housing part 5A and the fourth housing wall $GW_4$ of the second housing part 5B have a flush transition to one another at the connection line 15. The situation is similar on the opposite side at the transition from the first housing wall $GW_1$ to the third housing wall $GW_3$. The first housing part 5A and the second housing part 5B can also, for example, be snapped, staked, and/or welded together in the assembled state of the housing 5.

Figure 9:
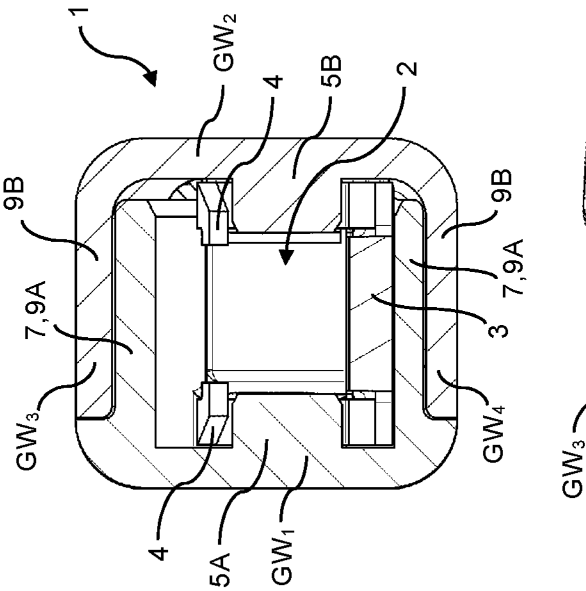
FIG. 9 is a sectional side view of the conductor connection terminal with placed contact insert and assembled housing.

FIG. 9 shows a sectional side view of the conductor connection terminal 1 with placed contact insert 2 and housing 5 assembled from the housing parts 5A, 5B. It can be seen in this view that the first housing part 5A and the second housing part 5B each have a U-shaped cross section in the embodiment shown, wherein, in the assembled state of the housing 5, the arms 9B of the U of the second housing part 5B receive the arms 9A of the U of the first housing part 5A between them, and the arms 9A of the U of the first housing part 5A receive the contact insert 2 between them.

Figure 10:
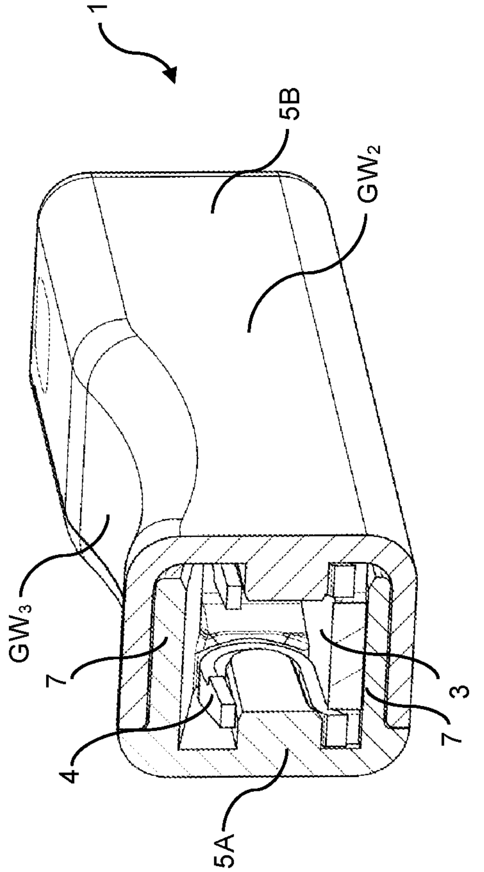
FIG. 10 is a perspective sectional side view of the conductor connection terminal with placed contact insert and assembled housing.

FIG. 10 shows the sectional view of the conductor connection terminal 1 from FIG. 9 in a perspective representation for additional illustration.

Figure 11:
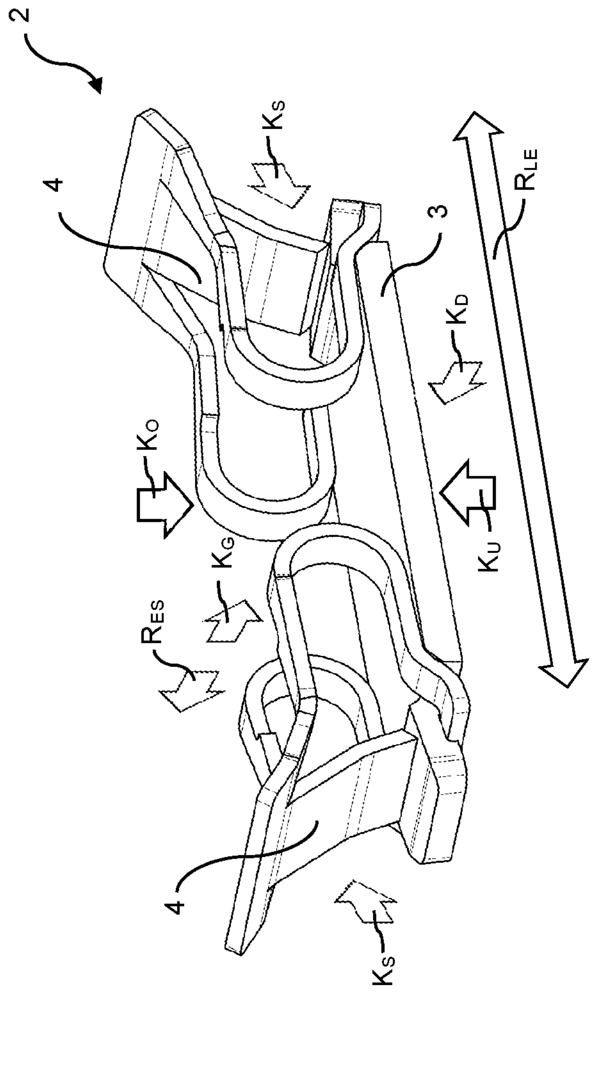
FIG. 11 is a contact insert for a conductor connection terminal.

FIG. 11 shows a preassembled contact insert 2 for the conductor connection terminal 1 in a perspective view. The contact insert 2 has a bus bar 3, to each of whose ends is attached a clamping spring 4 for forming a spring-loaded terminal connection with an electrical conductor. The contact insert 2 has two end faces $K_S$, through which the respective electrical conductor is brought closer to and inserted into the contact insert 2. The contact insert 2 additionally has a bottom $K_U$ facing the bus bar 3 as well as a top $K_O$ opposite the bottom $K_U$. In addition, the contact insert 2 has a cover side $K_O$ facing the cover housing 5B as well as a housing side KG facing the basic housing 5A, which can also be interchanged in the case of a symmetrical design of the contact insert 2. The bottom $K_U$, the top $K_O$, the cover side $K_O$, and the housing side KG of the contact insert 2 can be regarded as longitudinal sides of the contact insert 2. The contact insert 2 has a longitudinal extent in a direction $R_{LE}$ of longitudinal extent that is parallel to a direction of insertion of the electrical conductor.

Figure 12A:
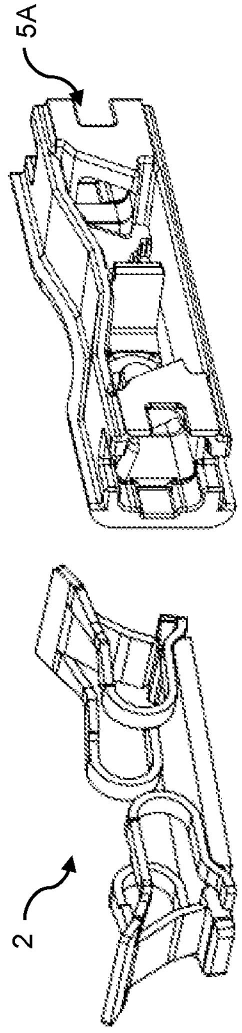
FIGS. 12A-12C illustrate a method for assembling a conductor connection terminal.
Figure 12B:
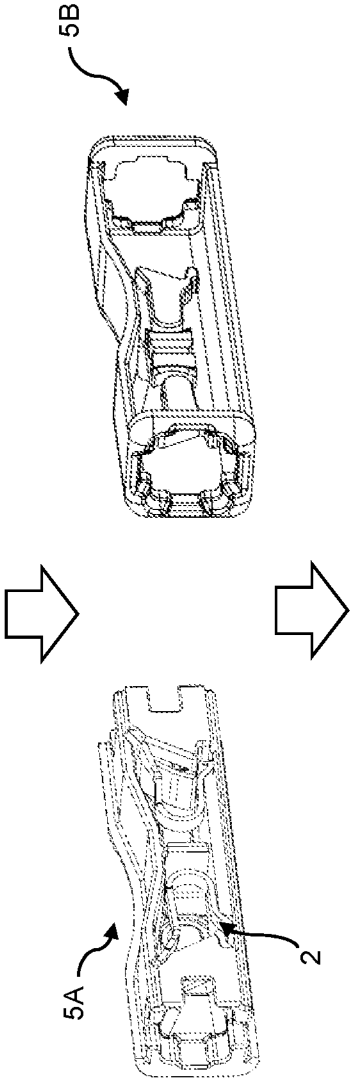
Figure 12C:
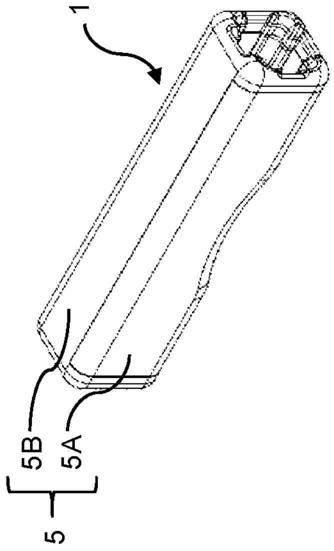

FIGS. 12A-12C show a method for assembling a conductor connection terminal 1 from a contact insert 2 that has a bus bar 3 and a clamping spring 4 (or in this case two clamping springs), a first housing part 5A, and a second housing part 5B. In a method step A), a contact insert 2 is placed in a first housing part 5A at right angles to the insert's direction of longitudinal extent. The contact insert 2 can be available preassembled or be fitted together from the bus bar 3 and the clamping spring 4 or clamping springs 4 in an upstream preparatory step. In a method step B) following the method step A), the housing part 5B having multiple housing walls is arranged on, for example attached to, the first housing part 5A. In this case, the attachment direction of the second housing part 5B on the first housing part 5A corresponds to the placement direction of the contact insert 2 in the first housing part 5A, in particular. In a method step C) following the method step B), the first housing part 5A is connected, for example snapped, staked, or welded, to the second housing part 5B.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A conductor connection terminal comprising:

a contact insert that has a bus bar and a clamping spring; and a housing that has a first housing part and a second housing part and that at least partially encloses the contact insert, wherein the first housing part has a first housing wall with a receiving structure for receiving the contact insert and the second housing part has multiple additional housing walls for covering the contact insert received by the first housing part, wherein the receiving structure of the first housing part has frame walls that project essentially at right angles from the first housing wall and wherein, together with the first housing wall delimits a receiving space for the contact insert, wherein the first housing part and the second housing part each have a U-shaped cross section, wherein, in an assembled state of the housing, arms of the U-shaped cross section of the second housing part receive arms of the U-shaped cross section of the first housing part therebetween, such that the arms of the second housing part overlap with the arms of the first housing part, and wherein the arms of the first housing part receive the contact insert therebetween, wherein the arms of the first housing part are formed by the frame walls and the arms of the second housing part are formed by two of the additional housing walls, and wherein the frame walls overlap with the two of the additional housing walls, respectively, by a degree of overlap of more than 50%, such that regions of the housing have a double wall structure.

2. The conductor connection terminal according to claim 1, wherein the frame walls extend along longitudinal sides of the contact insert.

3. The conductor connection terminal according to claim 1, wherein the frame walls include a frame wall that extends along a bottom of the contact insert facing the bus bar of the contact insert and/or a frame wall that extends along a top of the contact insert facing away from the bus bar of the contact insert.

4. The conductor connection terminal according to claim 1, wherein the additional housing walls of the second housing part include at least three housing walls for covering the contact insert and/or the first housing part.

5. The conductor connection terminal according to claim 1, wherein at least one of the additional housing walls of the second housing part completely overlaps at least one of the frame walls of the first housing part in an assembled state of the housing.

6. The conductor connection terminal according to claim 1, wherein the second housing part has a housing end wall for covering the housing on an end face.

7. The conductor connection terminal according to claim 1, wherein the conductor connection terminal is a double terminal for two electrical conductors that are each adapted to be inserted into the conductor connection terminal in a respective insertion direction.

8. The conductor connection terminal according to claim 1, wherein a partition projects at a right angle from the at least one of the frame walls and/or from the first housing wall of the first housing part.

9. The conductor connection terminal according to claim 8, wherein the second housing part has a partition receptacle, wherein the partition of the first housing part is inserted into the partition receptacle of the second housing part in an assembled state of the housing.

10. The conductor connection terminal according to claim 1, wherein the frame walls have a support block projecting at right angles therefrom.

11. The conductor connection terminal according to claim 10, wherein the support block has a conductor insertion channel area.

12. The conductor connection terminal according to claim 1, wherein the contact insert and/or the housing have a symmetrical construction.

13. The conductor connection terminal according to claim 1, wherein the first housing part and the second housing part are snapped, staked, and/or welded together in an assembled state of the housing.

14. The conductor connection terminal according to claim 1, wherein the first housing part has a first conductor insertion channel section and the second housing part has a second conductor insertion channel section, and wherein, in an assembled state of the housing, the first conductor insertion channel section and the second conductor insertion channel section together form a conductor insertion channel for insertion of an electrical conductor.

15. The conductor connection terminal according to claim 14, wherein the first conductor insertion channel section and/or the second conductor insertion channel section is designed to be predominantly closed on a perimeter.

16. The conductor connection terminal according to claim 14, wherein the first conductor insertion channel section is arranged after the second conductor insertion channel section in an insertion direction of the electrical conductor.

17. The conductor connection terminal according to claim 14, wherein the housing has a conductor insertion opening for insertion of the electrical conductor, the conductor insertion opening being formed in the second conductor insertion channel section.

18. The conductor connection terminal according to claim 1, wherein the conductor connection terminal is a repair terminal for connecting line sections of a severed electrical conductor or two free conductor ends.

19. A method for assembling a conductor connection terminal according to claim 1, the method comprising:

placing the contact insert in the first housing part; and arranging, subsequently, the second housing part having multiple housing walls on the first housing part and connecting thereto.

20. The method according to claim 19, wherein a placement direction of the contact insert in the first housing part is at right angles to a direction of longitudinal extent of the contact insert.

21. A conductor connection terminal, comprising:

a contact insert that has a busbar and a clamping spring; and a housing that has a first housing part and a second housing part, and that at least partially encloses the contact insert, wherein the first housing part has a first housing wall with a receiving structure for receiving the contact insert and the second housing part has multiple additional housing walls for covering the contact insert received by the first housing part, wherein the receiving structure has frame walls projecting essentially transversely from the first housing wall, wherein, the frame walls, together with the first housing wall, delimit a receiving space for the contact insert, and wherein at least one of the frame walls of the first housing part has a frame recess which, in an assembled state of the housing, is parallel to a housing wall recess of the second housing part, the frame recess and the housing wall recess together forming a grip recess for gripping the conductor connection terminal.

* * * * *